Dec. 22, 1953     C. W. MILLIKEN     2,663,555
IMPLEMENT FOR TURNING LITTER IN POULTRY HOUSES
Filed Aug. 8, 1952

INVENTOR.
CLAIR W. MILLIKEN,
BY

McMorrow, Berman & Davidson
ATTORNEYS.

Patented Dec. 22, 1953

2,663,555

UNITED STATES PATENT OFFICE 2,663,555

IMPLEMENT FOR TURNING LITTER IN POULTRY HOUSES

Clair W. Milliken, Brighton, Ill.

Application August 8, 1952, Serial No. 303,437

4 Claims. (Cl. 259—144)

This invention relates to hand operated implements for turning litter in poultry houses and similar locations and more particularly to an implement which can be manually pushed along a floor to turn the litter on the floor at a rapid rate.

It is among the objects of the invention to provide an improved litter turning implement for poultry houses which is of sled-like construction and can be manually pushed along a floor through litter, such as wood shavings, peat moss, or chopped straw or other dry vegetable material, and will raise the litter and permit poultry droppings to fall from the top to the bottom of the layer of litter as the implement is moved along the floor; which enables one operator to turn a quantity of litter in a short interval of time as compared to the time required to turn the same quantity of litter by hand forks; which is adjustable for varying depths of the layer of litter on the floor; and which is simple and durable in construction, economical to manufacture, easy to use, and effective and efficient in operation.

Figure 1:
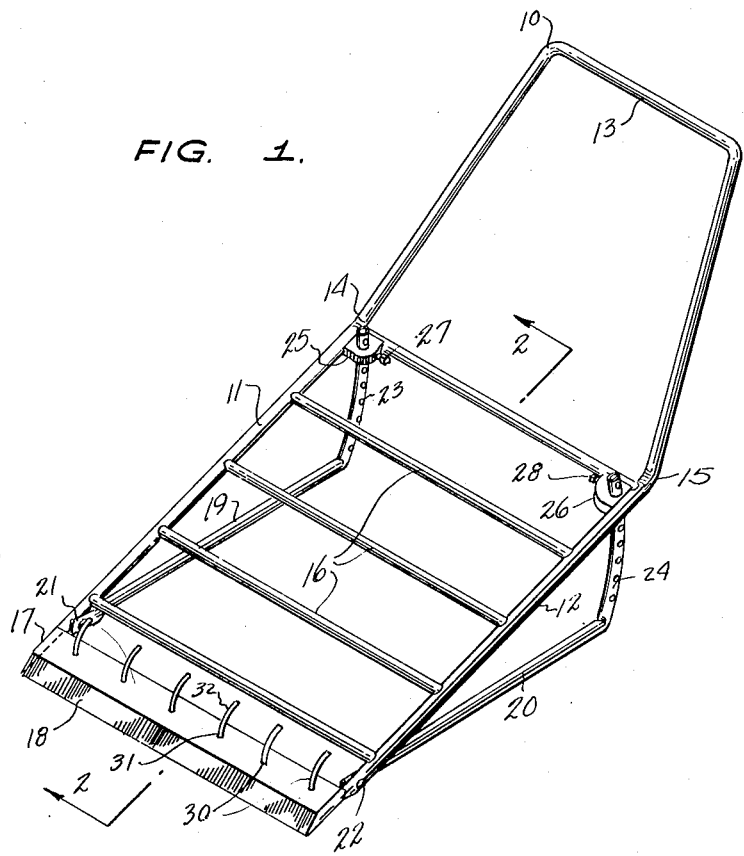
Figure 2:
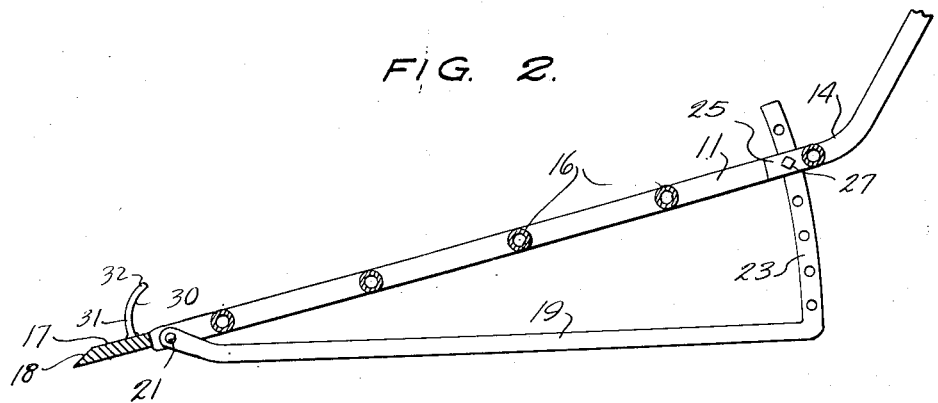

Other objects and advantages will become apparent from a consideration of the following description and the appended claims in conjunction with the accompanying drawing wherein:

Figure 1 is a perspective view of a litter turning implement illustrative of the invention; and Figure 2 is a longitudinal cross sectional view on the line 2—2 of Figure 1.

With continued reference to the drawing, the implement comprises a U-shaped frame 10 having spaced apart and substantially parallel legs 11 and 12 and an intermediate or bight portion 13 at one end of the frame, the intermediate portion 13 serving as a handle for the implement, as will later appear.

The legs 11 and 12 are bent intermediate their length, as indicated at 14 and 15 respectively so that the portion of the frame including the intermediate portion 13 is disposed at an angle to the remaining longitudinal portion of the frame adjacent the open end of the frame.

Transverse bars 16 are disposed within the portion of the frame adjacent the open end of the latter and extend between the legs 11 and 12 of the frame perpendicular to the legs and in uniformly spaced apart and substantially parallel relationship to each other, the spacing of the bars 16 being such as to permit litter pushed up onto the corresponding portion of the frame to fall downwardly between the bars.

An elongated blade 17 extends across the open end of the frame 10 and is secured at its respectively opposite ends to the frame legs 11 and 12 at the open end of the frame. This blade is substantially parallel to the transverse bars 16 and has its edge remote from the frame beveled on its upper side, as indicated at 18, to provide a beveled scraping edge at the side of the blade remote from the frame.

Elongated runners 19 and 20 extend one along each of the frame legs 11 and 12 and the runner 19 is pivotally connected at one end to the frame leg 11 adjacent the blade 17 by pivotal connection 21 while the runner 20 is pivotally connected at one end to the frame leg 12 adjacent the blade 17 by a pivotal connection 22. The runners 19 and 20 diverge downwardly from the frame legs 11 and 12 in a direction away from the open end of the frame and are provided at their ends remote from the open end of the frame with angularly disposed, longitudinally curved arms 23 and 24 respectively which extend upwardly from the ends of the runners past the corresponding legs 11 and 12 of the frame.

Guide rings 25 and 26 are secured to the frame legs 11 and 12 at the inner sides of the frame legs and at the adjoining ends of the two angularly disposed portions of the frame and the arm 23 on the runner 19 extends slidably through the guide ring 25 while the arm 24 on the runner 20 extends slidably through the guide ring 26.

A set screw 27 is threaded through a tapped hole in the guide ring 25 and has one end in engagement with the arm 23 and a similar set screw 28 is threaded through a tapped hole in the guide ring 26 and has one end in engagement with the arm 24. The set screws 27 and 28 are effective to lock the corresponding arm in the guide rings 25 and 26 at selected positions of angular adjustment of the runners 19 and 20 relative to the corresponding frame legs 11 and 12.

The runners 19 and 20 are angularly adjusted relative to the frame to condition the implement for operation in different depths of litter and support the intermediate portion 13 of the frame at a height above an associated floor suitable for use of this intermediate portion of the frame as a handle for manually pushing the implement along the floor.

A plurality of teeth or pins 30 are mounted on the blade 17 at uniformly spaced apart locations along the blade and these teeth have portions extending perpendicularly upwardly from the blade and terminal portions disposed at an angle to the above described portions and extending at an angle from the above described portions toward the intermediate portion 13 of the frame. The portions 31 of these pins extending upwardly from the blade are preferably approximately one inch in length and the terminal portions 32 extending toward the closed end of the frame are preferably approximately two inches in length. These pins have the effect of shaking or agitating the litter as it is picked up from the floor and together with the cross bars 17 turn the litter above the floors so that poultry droppings on top of the litter fall to the bottom of the layer of litter as the litter is turning and clean litter is brought to the top surface.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A litter turning implement comprising a U-shaped frame having its legs bent intermediate their length so that the part of said frame including the intermediate portion thereof is disposed at an angle to the portion adjacent the open end, transverse bars disposed in the portion of said frame adjacent the open end thereof and extending between said legs in spaced apart and substantially parallel relationship to each other, an elongated blade secured near its opposite ends to said legs at the open end of said frame and projecting outwardly from said frame, said blade having a beveled scraping edge remote from said frame, runners disposed one along each of said frame legs and each having one end pivotally connected to the corresponding leg adjacent said blade and an angularly disposed arm on its other end extending past the corresponding frame leg, guide rings on said frame legs near the adjoining ends of said frame portions respectively receiving said arms, and means carried by said guide rings and engaging said arms to lock said runners in selected positions of angular adjustment relative to said frame legs, said runners supporting the intermediate portion of said frame above an associated floor for use as a handle for manually pushing the implement along the floor.

2. A litter turning implement comprising a U-shaped frame having spaced apart legs and an intermediate portion interconnecting said legs at one end of the frame, transverse bars extending between said legs in the portion of said frame adjacent the open end of the latter and in spaced apart and substantially parallel relationship to each other, an elongated blade secured near its opposite ends to said legs at the open end of said frame and projecting outwardly from the frame, said blade having a beveled scraping edge remote from said frame, curved pins propecting upwardly from said blade at spaced apart locations therealong and toward the intermediate portion of said frame, runners disposed one along each of said frame legs and each having one end pivotally connected to the corresponding leg near said blade and an angularly disposed arm on its other end extending past the corresponding frame leg, guide rings on said frame legs intermediate the length of the latter respectively receiving said arms, and means carried by said guide rings and engaging said arms to lock said runners in selected positions of angular adjustment relative to said frame legs.

3. A litter turning implement comprising a U-shaped frame having spaced apart legs and an intermediate portion interconnecting said legs at one end of the frame, transverse bars extending between said legs in the portion of said frame adjacent the open end of the latter and in spaced apart and substantially parallel relationship to each other, an elongate blade secured near its opposite ends to said legs at the open end of said frame and projecting outwardly from the frame, said blade having a beveled scraping edge remote from said frame, curved pins projecting upwardly from said blade at spaced apart locations therealong and toward the intermediate portion of said frame, runners disposed one along each of said frame legs and each having one end pivotally connected to the corresponding leg near said blade and an angularly disposed arm on its other end extending past the corresponding frame leg, guide rings on said frame legs intermediate the length of the latter respectively receiving said arms, and means carried by said guide rings and engaing said arms to lock said runners in selected positions of angular adjustment relative to said frame legs, said runners diverging downwardly from said frame legs in a direction away from said pivotal connections for supporting the intermediate portion of said frame above an associated floor for use as a handle in pushing the implement along the floor.

4. A litter turning implement comprising a U-shaped frame having end portions disposed at an angle to each other, bars extending transversely across one end portion of said frame in spaced apart and substantially parallel relationship to each other, a scraper blade extending across the distal end of said one end portion, and runners disposed below said one end portion one at each side thereof holding said one end portion in a position in which it is upwardly inclined in a direction away from said blade, the other end porton of said frame extending upwardly and outwardly from said one end portion at the proximal end of the latter and having at its distal end a transversely extending element constituting an operating handle for the implement.

CLAIR W. MILLIKEN.

References Cited in the file of this patent

UNITED STATES PATENTS

| Number | Name | Date |
|---|---|---|
| 13,381 | Bailey | Aug. 7, 1855 |
| 40,764 | Maydole | Dec. 1, 1863 |
| 648,342 | Bryant | Apr. 24, 1900 |
| 1,350,098 | Hersey | Aug. 7, 1920 |